United States Patent [19]

Willer et al.

[11] Patent Number: 5,017,356

[45] Date of Patent: May 21, 1991

[54] PREPARATION OF CYANOGEN FROM GLYOXIME

[75] Inventors: Rodney L. Willer, Newark; Dennis Park, Wilmington, both of Del.; Alfred G. Stern, Elkton, Md.

[73] Assignee: Thiokol Corporation, Ogden, Utah

[21] Appl. No.: 526,163

[22] Filed: May 21, 1990

[51] Int. Cl.$^5$ .............................. C01C 3/00
[52] U.S. Cl. ................................. 423/384
[58] Field of Search ....................... 423/384

[56] References Cited

U.S. PATENT DOCUMENTS

| | | | |
|---|---|---|---|
| 2,841,472 | 7/1958 | Fierce et al. | 23/151 |
| 3,302,996 | 2/1967 | Isbell | 23/151 |
| 4,032,620 | 6/1977 | Onada et al. | 423/384 |
| 4,503,025 | 3/1985 | Fauss et al. | 423/384 |

FOREIGN PATENT DOCUMENTS

| | | | |
|---|---|---|---|
| 889716 | 2/1962 | United Kingdom | 423/384 |
| 991352 | 5/1965 | United Kingdom | 423/384 |

OTHER PUBLICATIONS

American Chemical Society database report, 9 pages, undated.

*Primary Examiner*—Wayne A. Langel
*Attorney, Agent, or Firm*—Parmelee, Bollinger & Bramblett

[57] ABSTRACT

Cyanogen is prepared from glyoxime by reaction with acetic anhydride to form N,N'-diacetoxyglyoxime which is then pyrolyzed to cyanogen.

2 Claims, No Drawings

PREPARATION OF CYANOGEN FROM GLYOXIME

FIELD OF THE INVENTION

This invention relates to a novel method for the production of cyanogen from glyoxime and acetic anhydride.

BACKGROUND OF THE INVENTION

Cyanogen, $C_2N_2$ (CAS 460-19-5), is a highly poisonous, colorless gas which is acrid and pungent in lethal concentrations. Due to its high stability and reactiveness cyanogen has many uses in a wide variety of organic syntheses. For example, cyanogen is employed to prepare diaminoglyoxime and diaminofurazan. The latter two compounds have important and significant uses to modify the exponent and burn rates of solid propellants, such as, for example, those propellants used in gas generators and rocket motors. Additionally, cyanogen has been found useful in the preparation of certain pharmaceutically active compounds as well as useful in the production of carbon fibers.

Heretofore, two general methods for the production of cyanogen have been employed. In the first method, cyanogen is prepared by adding an aqueous solution of sodium or potassium cyanide to an aqueous solution of copper II sulfate or chloride. In the second method, cyanogen is prepared by the vapor phase reaction between hydrogen cyanide and chlorine gas at elevated temperatures.

Problems with the first method include a low yield of cyanogen, i.e. about 41%, and the production of the toxic by-product CuCN. In the second method, the reagents used are very toxic gases, namely HCN and $Cl_2$. The reaction conditions require the toxic gases to be reacted in a quartz reactor in the presence of a carbon catalyst at an average temperature of 650° C. This procedure requires some specialized apparatus. In addition, the cost to maintain a high temperature is quite expensive.

Additionally, it has been proposed to produce cyanogen from HCN and CuO. However, in addition to the use of a highly toxic gas as a reactant and the need for special reaction vessels, the process produced many undesirable by-products. Moreover, prior processes for the production of cyanogen have required careful monitoring of temperature and/or pressure.

It is therefore desirable that an improved process for the production of cyanogen be provided which produces cyanogen in an improved yield and without production of toxic by-products. A further object of this invention is to provide a process for the production of cyanogen which utilizes readily available reagents which are not toxic gases. A still further object of this invention is to provide a process for the production of cyanogen which requires neither specialized process equipment nor elevated pressure. It is yet another object of this invention to provide such a process which utilizes non-toxic solids and liquid reactants and proceeds within a reasonable temperature range. Yet another object of this invention is to provide such a process in which any by-products produced are useful or easily disposed of, or purified or recycled.

SUMMARY OF THE INVENTION

An improved process for the preparation of cyanogen comprises the reaction of glyoxime with acetic anhydride to form N,N'-diacetoxyglyoxime which is then pyrolyzed to cyanogen. In this process the by-product formed is acetic acid.

DETAILED DESCRIPTION OF THE INVENTION

According to the process of this invention, glyoxime is reacted with acetic anhydride at an elevated temperature of up to about 60°-65 ° C. to produce N,N'-diacetoxyglyoxime and acetic acid. Subjecting the N,N'-diacetoxyglyoxime to pyrolysis at an elevated temperature of up to about 160° C. produces cyanogen and acetic acid. The process of this invention is illustrated by the following reaction equations:

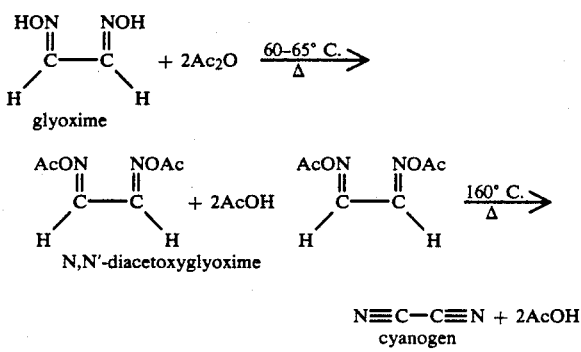

The crude N,N'-diacetoxyglyoxime intermediate need not be purified, i.e. it can be pyrolyzed without purification.

Glyoxime and acetic anhydride are readily available reactants. If desired, glyoxime may be prepared from glyoxal and hydroxy ammonium sulfate.

The process of this invention is further illustrated by the following example.

EXAMPLE

Glyoxime (44.1 g, 0.50 mole) and acetic anhydride (100 mL, 1.06 mole) were placed in a 250 mL 3-neck round bottom flask equipped with a $N_2$ inlet and outlet (attached to a bubbler), and a thermocouple. The flask was heated (oil bath) to 65° C. At this temperature an exothermic reaction occurred, and the reaction temperature was maintained between 60-65° C. by cooling (ice bath). When the exothermic reaction subsided, i.e. the reaction temperature dropped below 60° C., the solution was heated to 60°-65° C. for an additional 10 min. The solution was then transferred to a 500 mL round bottom flask, and the solvent was evaporated at 55° C. under vacuum for 1 hr. to yield crude N,N'-diacetoxyglyoxime (89% yield). An analytical sample of N,N'-diacetoxyglyoxime was obtained via recrystallization from a minimal amount of $CHCl_3$.

DSC (mp 111.7°-117.5° C.); exotherms 176.1° C. J/g; 301.8° C. 175 J/g. DTA=endotherm@94° C., self heating@140° C., fume-off @181° C. complete @205° C. $^1$H-NMR (60 MHz, $CDCl_3$) 2.30 (s, 6H, 8.17 (s, 2H). FTIR (KBr); 3019.8 (w), 2948.5 (w), 1778.4 (s), 1374.4 (m), 1190 (s), 1001.1 (mk), 930 (s), 904.75 (s), 639.07 (m), 588.88 (m).

Crude N,N'-diacetoxyglyoxime (17.7g, 0.10 mole) was placed in a 100 mL 3-neck round bottom flask equipped with $N_2$ inlet, $N_2$ outlet with thermocouple, and stopper. The $N_2$ outlet was connected to three traps before exiting to a bubbler. The first two traps were cooled to 3° C. (ice water) while the third trap was cooled to −77° C. (isopropyl alcohol/dry ice). A slow amount of $N_2$ was allowed to bubble through the system. The round bottom was slowly heated (oil bath) to 90° C. until all the N,N'-diacetoxyglyoxime melted. The material was then heated to 160° C. where an exothermic reaction occurred. The temperature was allowed to rise. The pyrolysis was finished when the exothermic reaction had subsided, i.e. after about 45 min. The first two traps contained acetic acid while the third trap contained crude cyanogen (77% yield). Cyanogen was confirmed by FTIR.

With the foregoing description of the invention, those skilled in the art will appreciate that modifications may be made to the invention without departing from the spirit thereof. Therefore, it is not intended that the scope of the invention be limited to the specific embodiments illustrated and described.

We claim:

1. A process for the preparation of cyanogen comprising reacting glyoxime with acetic anhydride at an elevated temperature to form N,N'-diacetoxyglyoxime and pyrolyzing said N,N'-diacetoxyglyoxime at an elevated temperature to produce cyanogen.

2. The process of claim 1 wherein the glyoxime and acetic anhydride are reacted at an elevated temperature of up to about 65° C. and the pyrolysis of N,N'-diacetoxyglyoxime is conducted at an elevated temperature of about 160° C.

* * * * *